June 1, 1954

E. E. SIVACEK 2,679,830

FLUID MOTOR MECHANISM

Filed March 22, 1948

INVENTOR.
Emil E. Sivacek.
BY
Harness, Dickey & Pierce
ATTORNEYS.

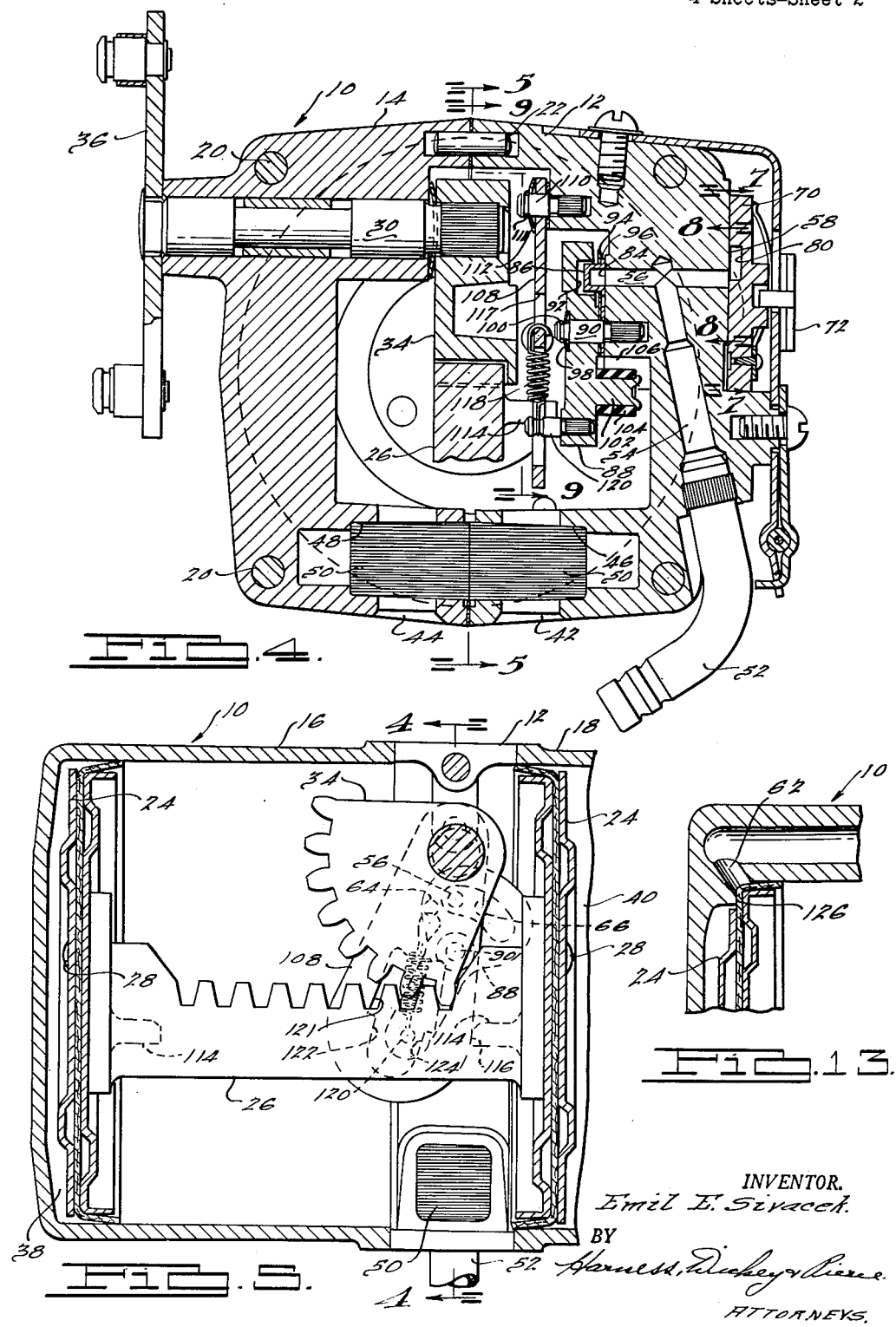

June 1, 1954 E. E. SIVACEK 2,679,830
FLUID MOTOR MECHANISM

Filed March 22, 1948 4 Sheets-Sheet 3

INVENTOR.
Emil E. Sivacek.
BY
Harness, Dickey & Pierce
ATTORNEYS.

INVENTOR.
Emil E. Sivacek
BY
Harness, Dickey & Pierce
ATTORNEYS.

Patented June 1, 1954

2,679,830

UNITED STATES PATENT OFFICE 2,679,830

FLUID MOTOR MECHANISM

Emil E. Sivacek, Ann Arbor, Mich., assignor to King-Seeley Corporation, Ann Arbor, Mich., a corporation of Michigan Application March 22, 1948, Serial No. 16,271

3 Claims. (Cl. 121—164)

The present invention relates to fluid motors and particularly relates to a fluid motor construction of the type embodying automatically operable reversing valve mechanism and having particular utility for operating automobile windshield wipers.

Principal objects of the present invention are to provide a fluid motor mechanism of the above generally indicated type which is simple in construction, economical of manufacture and assembly, and which is reliable and efficient in operation; to provide such a mechanism embodying a casing of improved construction; to provide in such a mechanism, a casing having improved silencing means incorporated therein; to provide such a mechanism having an improved automatically operable reversing valve mechanism; to provide an improved reversing valve mechanism of the type in which the mechanism is first moved at one speed to a reversing position and then is snapped to accomplish a reversal in a quick manner; to provide an improved over-center spring action for reversing the motor in a quick manner; to provide an improved valve action in motors of the type mentioned; to generally improve and simplify the construction and arrangement of mechanisms of the above type.

With the above as well as other and more detailed objects in view, which will become apparent from a consideration of the accompanying drawings, the following description, and the appended claims, a preferred but illustrative embodiment is shown in the drawings, throughout the several views of which corresponding reference characters are used to designate corresponding parts and wherein:

Figure 4 is an enlarged view in vertical transverse section taken along the line 4—4 of Figure 5;

Figure 5 is a partial view in longitudinal section taken substantially along the line 5—5 of Fiure 4;

Figure 1:
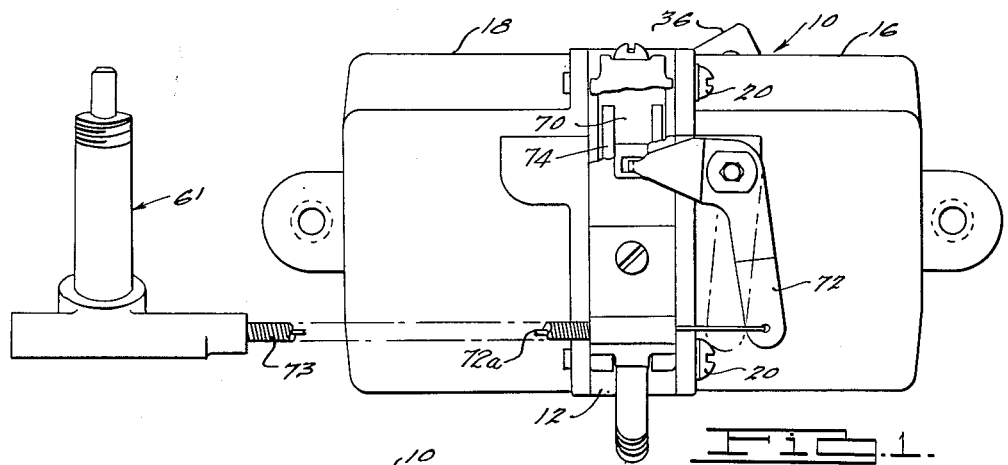
Figure 1 is a view in side elevation showing a preferred embodiment of the invention.
Figure 2:
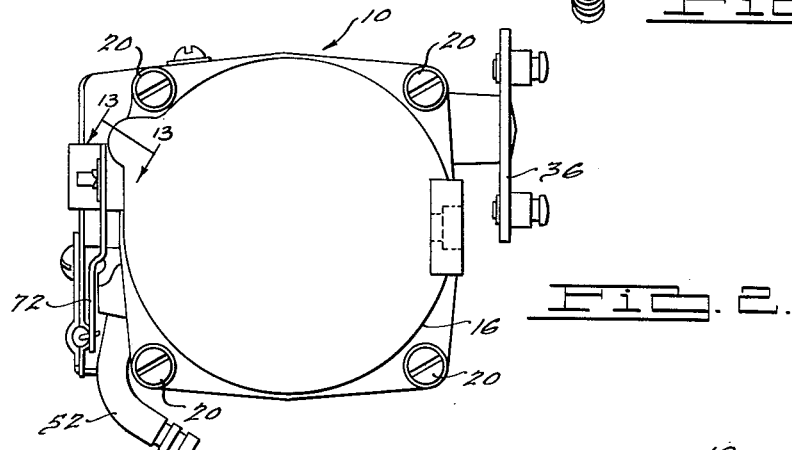
Figure 2 is an end view of the embodiment shown in Figure 1.
Figure 3:
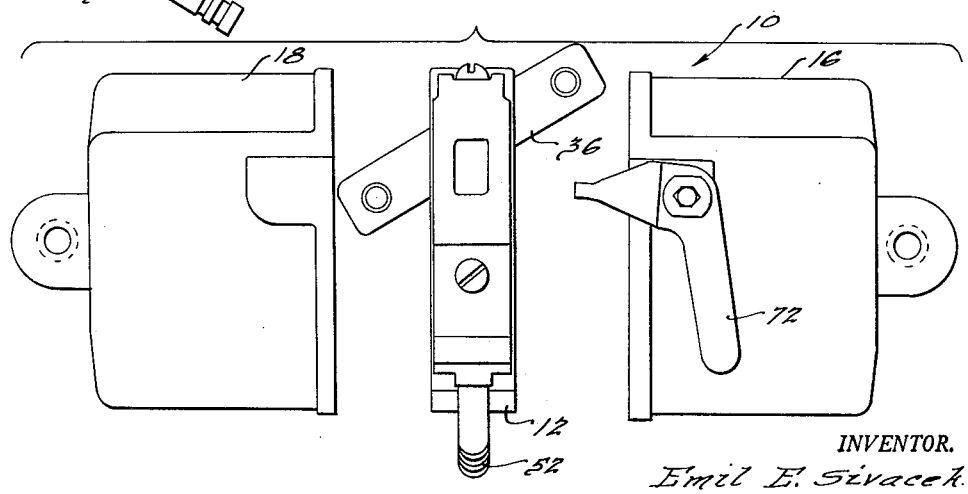
Figure 3 is an exploded view of the casing of the embodiment shown in Figure 1.
Figure 12:
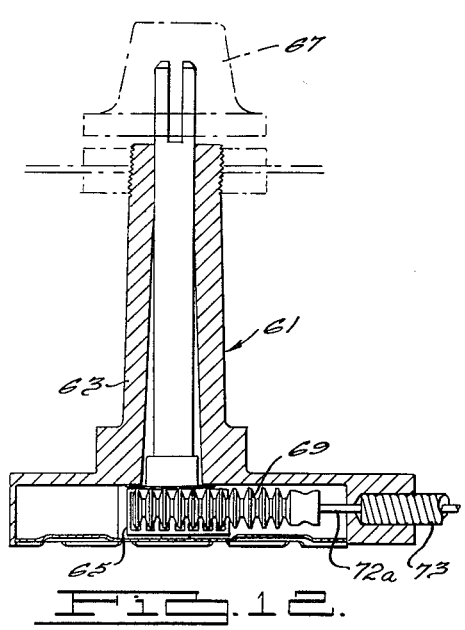
Figure 6:
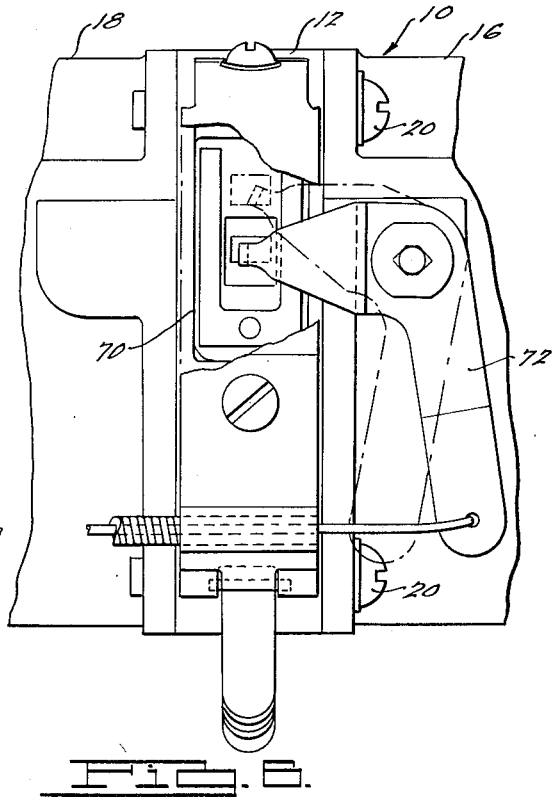
Figure 6 is an enlarged partial view in side elevation of the embodiment shown in Figure 1.
Figure 7:
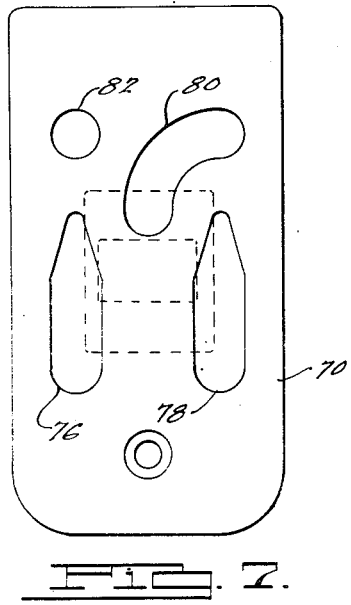
Figure 8:
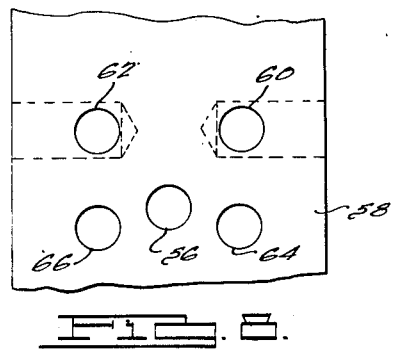
Figure 9:
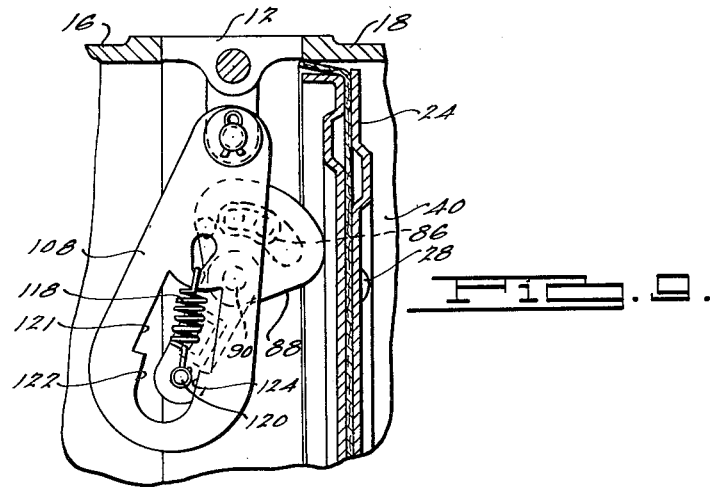
Figures 10, 11:
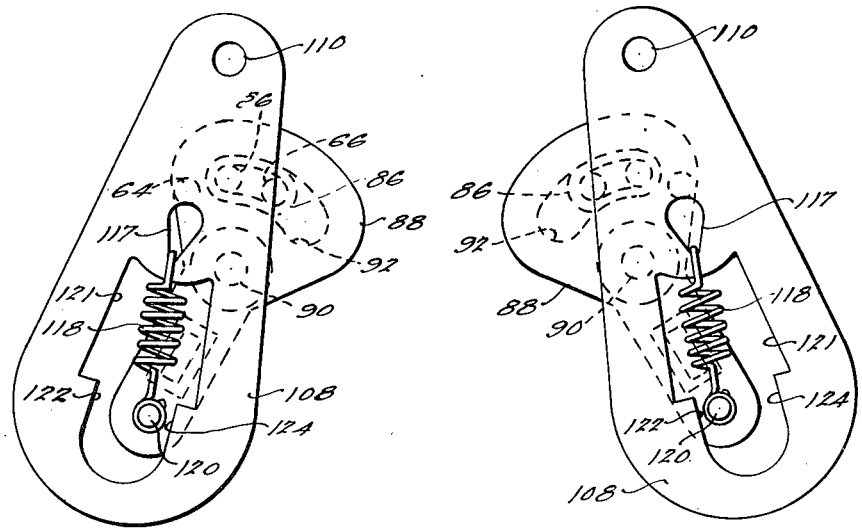

Figures 7 and 8 are enlarged fragmentary views taken along the lines 7—7 and 8—8 of Figure 4;

Figure 9 is a fragmentary view taken substantially along the line 9—9 of Figure 4;

Figure 10 is an enlarged partial view illustrating the position of the elements of the reversing valve mechanism in one position;

Figure 11 is an enlarged fragmentary view similar to Fig. 10 showing the elements of the reversing mechanism in the opposite position;

Figure 12 is an enlarged sectional view of the control assembly illustrated in Fig. 1; and Figure 13 is a sectional view of the structure illustrated in Fig. 2 taken along the line 13—13 thereof showing the piston assembly in the parked position.

Although the fluid motor mechanism of the present invention has a particular utility when used for operating automobile windshield wipers it will be appreciated by those skilled in the art that in its generic aspects it has other uses within the scope of the present invention.

Referring to the drawing, and particularly to Figs. 1-5 inclusive, the casing or housing 10 of the fluid motor there illustrated is generally cylindrical and comprises complementary center members 12 and 14 (Fig. 4), and cup-shaped end members 16 and 18. The end members 16 and 18 are removably secured to the complementary members 12 and 14 by a plurality of screws 20 which at the same time serve to maintain the complementary center members 12 and 14 in abutting relation. The center members are located relative to each other and held in position during assembly by a longitudinally serrated dowel pin 22 having one end mounted in the center member 12 and the other end reecived in a complementary recess formed in the center member 14.

Referring to Figs. 4 and 5, the interior of the housing 10 is cylindrically shaped and slidably receives a piston assembly comprising a pair of spaced pistons 24 rigidly mounted on a connecting rack 26 by means of rivets 28. A motor output shaft 30 is journaled in the center member 14 of the casing 10 and is driven through a gear segment 34 mounted on a longitudinally serrated portion adjacent its inner end and continuously meshing with the rack 26. Accordingly, reciprocative movements of the piston assembly are translated into oscillatory or rocking movements by the output shaft 30. In the illustrated embodiment, the output shaft 30 at its outer end is provided with a crank 36 which is adapted for connection to the mechanism to be operated by the motor.

The pistons 24 co-operate with the end members 16 and 18 of the casing 10 to define chamber spaces 38 and 40 between the pistons 24 and their respective end members. The space between the pistons 24 is continuously vented to atmosphere by passages 42 and 44 formed in the complementary center members 12 and 14, respectively, of the casing 10. The passage 42 has an enlarged center portion 46 communicating with a similar and complementary enlarged center portion 48 in the passage 44. A silencing or sound deadening material 50, such as felt or other material, is disposed within the enlarged center portions 46 and 48 and is effective to greatly reduce the noise audible from the exterior of the motor, as well as to filter the air which passes therethrough.

It will be appreciated that reciprocation of the piston is effected by applying differential fluid pressures in the chamber spaces 38 and 40. These differential pressures may of course be obtained from any suitable source. For example, in utilizing the present motor to drive an automobile windshield wiper system, the pressure differential may be the difference between atmospheric pressure and a sub-atmospheric pressure obtained in usual fashion by connecting the motor inlet stem 52 to the intake manifold of the associated engine.

At its inner end the inlet stem 52 communicates with a passage 54 formed in the casing 10. The passage 54 communicates with a passage 56 which opens through an external surface 58 of the center member 12, shown in Fig. 8. Additional passages 60 and 62 communicate with the chamber spaces 38 and 40, respectively, and open through the external surface 58 of the casing 10. Other passages 64 and 66, adapted for alternate communication with the passage 56 by an automatic reversing valve mechanism hereinafter described, also open through the surface 58 of the center member 12. A control valve 70 is mounted on the center member 12 in abutting relation to surface 58 thereof and adapted to slide along said surface in response to movement of a control valve lever 72 pivotally mounted on the casing member 16. The control valve 70 is movable along the surface 58 between a running position in which the output shaft 30 is oscillated as a result of the action of the automatic reversing valve mechanism to be presently described, and a parking position in which the shaft 30 is rotated to a parked position and stopped and held in that position. The valve 70 is maintained in close abutting relation against the surface 58 by a leaf spring 74 mounted on the valve 70 and engaging the inner surface of a covering strip 71 mounted on the center member 12. The just mentioned strip 71 is apertured to permit suitable interconnection of the valve 70 and the lever 72 through which it is operated.

For remotely controlling the lever 72, a control assembly 61 is mounted in a convenient location and comprises a T-shaped housing 63 rotatably mounting a pinion 65. Rotation of the pinion 65 is effected by means of a suitable handle 67 and is translated into longitudinal movement of a rack 69 with which it meshes. Movement of the rack 69 effects a corresponding movement of the outer end of the lever 72 through a wire 72a which is enclosed in a conventional flexible housing 73, one end of which is anchored to the housing 63 and the other end of which is anchored to the casing 10.

The surface of the control valve 70 adjacent and abutting the surface 58 is illustrated in Fig. 7, and is provided with a pair of elongated cavities 76 and 78 adapted to respectively connect the passage 64 to the passage 60, and the passage 66 to the passage 62, when the valve 70 is in the running or operating position. The cavities 76 and 78 are proportioned to facilitate partially covering the passages 60 and 62, respectively, in order to reduce their respective connections with the passages 64 and 66 and thereby vary the speed of operation of the motor.

In spaced relation to the cavities 76 and 78, the control valve 70 is provided with an arcuately shaped cavity 80 adapted to connect the passage 56 to the passage 62 when the control valve 70 is in the parked position. The valve 70 is also provided with an aperture 82 extending therethrough disposed to connect the passage 60 to atmosphere when the control valve is in the parking position.

The passages 64, 56 and 66 open through an internal surface 84 on the center member 12 to provide arcuately disposed openings or ports as seen in Figs. 5, 9, 10 and 11. The passage 56 is disposed between the passages 64 and 66 and is continuously covered by an arcuately shaped operating valve 86 adapted for movement between a position in which it connects the passage 56 to the passage 64 and a position in which it connects the passage 56 to the passage 66. It will now be appreciated that when the control valve 70 is in the operating position and the valve 86 is in one position connecting the passage 56 to one of the passages 64 or 66, a sub-atmospheric pressure is applied to one of the chamber spaces 38 and 40 and the other of said chamber spaces is connected to the space between the pistons 24 which is continuously vented to atmosphere as described above. In this set of conditions the piston moves toward the end in which the vacuum is created and when the valve is shifted to communicate the passage 56 with the other of the passages 64 and 66, it will be obvious that the movement of the pistons will be reversed.

In order to accomplish this reversal, a kicker 88 is pivotally mounted on a pin 90 supported in the center member 12 and is provided with an elongated arcuately shaped recess 92 adapted to receive said arcuately shaped valve 86 and permit movement of said valve therealong. A valve carrier spring 94 is also pivotally mounted on the pin 90 and is apertured to receive said valve 86. The spring 94 engages an outwardly extending flange 96 on the valve 86 to maintain said valve 86 in close abutting relation with the surface 84. The spring 94 and the kicker 88 are held in place on the pin 90 by a spring washer 98 received on the outer end of the pin 90 and held in place by a snap ring 100.

The kicker 88 is provided with an integral projection 102 formed on one side thereof and having a rubber bushing 104 mounted thereon for engaging opposed shoulders 106 integrally formed on the center member 12 to limit the movement of kicker 88 and prevent movement of the valve 86 beyond the desired limits.

The kicker 88 is moved in response to the movement of a spring carrier 108 which is pivotally mounted adjacent one end thereof on a pin 110 supported in the center member 12 and is secured thereon by a spring washer 112 received on said pin 110, and held in place by a snap ring 111.

Adjacent its opposite ends the rack 26 carries laterally extending projections 114 adapted to engage the edge of the spring carrier 108 as illustrated at 116 in Fig. 5, as the rack approaches its limits of movement, to pivot the spring carrier 108 about the pin 110.

The spring carrier 108 is provided with a small, generally centrally located aperture 117 through which is hooked one end of an over-center coil spring 118, the other end of which is connected to a pin 120 mounted on the kicker 88 and extending through an enlarged aperture 121 formed in the spring carrier 108. Portions of the spring carrier 108 surrounding the periphery of said aperture 121 provide opposed abutting portions 122 and 124.

When the projection 114 on the rack 26 engages the spring carrier 108 to pivot the latter, as described above, the kicker 88 remains stationary until an abutting surface 122 or 124 engages the pin 120 on the lower end of the kicker 88, after which time continued movement of the rack 26 pivots the spring carrier 108 about its pivot pin 110 and also pivots the kicker 88 about the pivot pin 90. These relative movements continue until the line of action of the spring 118, passes over the pivot point of the kicker 88, namely, the axis of the pivot pin 90. As the over-center spring 118 passes through this position, the force of the spring, which previously had acted to maintain the kicker in its initial position, now acts to pivot the kicker 88 about the pin 90 and snaps it to a position in which the valve 86 connects the passage 56 to the opposite of the passages 64 and 66, the kicker being stopped in this position by the engagement of the rubber bushing 104 and one of the shoulders 106 formed on the center member 12. This movement of the valve 86 reverses the application of the pressure differential causing the piston assembly to move in the opposite direction at the end of which movement the reversing operation is repeated.

It will be appreciated from the illustration of the above described reversing valve mechanism in Figures 10 and 11, the kicker 88 with its arcuate recess 92 receiving the valve 86, and the spring carrier 108 are so proportioned that during movement of the mechanism from the position illustrated in Figure 10 to the position illustrated in Figure 11, in response to engagement of the spring carrier 108 by one of the projections 114, the rigth-hand end of the recess 92, as seen in Figure 10 engages the valve 86 at substantially the same time that the line of action of the over-center spring 118 moves to the other side of the axis of pivotal movement of the kicker 88. As a result of this construction of the reversing valve mechanism any tendency of the valve 118 to stick will be positively overcome by the continuing pivotal movement of the kicker 88 which is directly engaged by the spring carrier 108 which is in turn directly engaged by the projection 114.

When the control valve 70 is moved to the parking position, the inlet stem 52 is connected directly to the chamber space 40 through the passages 54, 56, and 62, and the chamber space 38 is connected at atmosphere through the passage 60 and the openings 82. The reversing valve 86 is thus bypassed and rendered ineffective to determine the application of the pressure differential. This produces an effective pressure differential whereby the piston 24 is moved toward the end wall of the end member 18 until the piston 24 engages a boss 126 through which the passage 62 opens into the chamber 40, and closes the passage 62, as illustrated in Fig. 13. This movement of the piston assembly causes the automatic reversing valve mechanism to assume a position in which the valve 86 connects the passage 56 and the passage 64 with the result that when the control valve 70 is moved to the operating position the pressure differential applied is effective to move the piston to the opposite end.

The passage 60 opens into the chamber space 38 through a boss similar to the boss 126. As a result the piston assembly may be parked in either end position depending upon the design of the control valve 70. With the control valve 70 constructed as shown and described, the piston assembly parks in the described position against the boss 126 on end member 18, but if the cavity 80 and the aperture 82 are reversed so that cavity 80 connect the passage 56 to the passage 60, and the aperture 82 connects the passage 62 to atmosphere, the piston will park at the opposite end in the position illustrated in Fig. 13. This permits use of this motor with windshield wipers that are to park in either extreme position.

Although only a single embodiment of the invention has been described in detail, it will be appreciated that various modifications in the form, number and arrangement of the parts may be made without departing from the spirit of the invention or from the scope of the appended claims.

What is claimed is:

1. In a fluid motor, a pair of relatively movable elements, automatic reversing valve means adapted to occupy either one of two operating positions for controlling movement between said elements, said valve mechanism being operably responsive to the movement of one of said elements and including a valve movable between said positions, a pivotally mounted kicker operable to move said valve between said positions and having a lost motion connection with said valve, a pivotally mounted spring carrier engageable with said kicker and movable between first and second positions, tension spring means interconnecting said carrier and said kicker, said carrier engaging said kicker during movement between said positions and being effective during such movement to move the line of action of said tension spring means from one side of the axis of pivotal movement of said kicker to the opposite side of said axis, said valve, said kicker, said carrier and said spring being so constructed and arranged that said kicker has taken up the lost motion connection between it and said valve at substantially the same time during the movement of said carrier between said first and second positions that said line of action of said spring is moved to the opposite side of said axis so that sticking of said valve is positively prevented by movement of said carrier in response to movement of said one of said members.

2. In a fluid motor, a pair of relatively movable elements, automatic reversing valve means adapted to occupy either one of two operating positions for controlling movement between said elements, said valve mechanism being operably responsive to the movement of one of said elements and including a valve movable between said positions, a pivotally mounted kicker operable to move said valve between said positions and having an arcuate recess receiving said valve and providing a lost motion connection with said valve, a pivotally mounted spring carrier engageable with said kicker and movable between first and second positions, tension spring means interconnecting said carrier and said kicker, said carrier engaging said kicker during movement between said positions and being effective during such movement to move the line of action of said tension spring means from one side of the axis of pivotal movement of said kicker to the opposite side of said axis, the angular movement of said kicker relative to said valve permitted by said lost motion connection being substantially equal to the angular movement of said kicker by said carrier during that portion of the movement of said carrier from one of said first and second positions to the other which is necessary to move said line of action of said spring to the opposite side of said axis.

3. In a fluid motor, a pair of relatively movable elements, movable between two limiting positions, automatic reversing valve means adapted to occupy either one of two operating positions for controlling movement between said elements, said valve mechanism being operably responsive to the movement of one of said elements and including a valve movable between said positions, a pivotally mounted kicker operable to move said valve between said positions and having a lost motion connection with said valve, a pivotally mounted spring carrier engageable with said kicker and movable between first and second positions, abutment means on one of said elements for engaging said carrier during relative movement of said elements between said limiting positions, said carrier, said kicker, said valve and said abutment means being so constructed and arranged that during each relative movement of said elements between said limiting positions, one of said abutment means may engage said carrier and positively move said carrier to engage said kicker and positively move said kicker beyond the position in which the lost motion provided by said lost motion connection between said kicker and said valve has been fully taken up so as to positively initiate movement of said valve and thus positively overcome any tendency of the valve to stick.

References Cited in the file of this patent

UNITED STATES PATENTS

| Number | Name | Date |
|---|---|---|
| 1,665,204 | Folberth et al. | Apr. 10, 1928 |
| 1,840,233 | Hueber | Jan. 5, 1932 |
| 1,981,840 | Hueber et al. | Nov. 20, 1934 |
| 2,098,936 | Armstrong et al. | Nov. 16, 1937 |
| 2,162,002 | Davis | June 13, 1939 |
| 2,251,241 | Kellogg | July 29, 1941 |
| 2,260,853 | Hueber | Oct. 28, 1941 |
| 2,263,151 | White | Nov. 18, 1941 |
| 2,354,189 | Bell | July 25, 1944 |
| 2,602,430 | Bell | July 8, 1952 |